United States Patent [19]

Lipo et al.

[11] Patent Number: 5,010,267
[45] Date of Patent: Apr. 23, 1991

[54] VARIABLE SPEED MACHINE WITH HIGH POWER DENSITY

[75] Inventors: Thomas A. Lipo; Longya Xu, both of Madison, Wis.

[73] Assignee: Wisconsin Alumni Research Foundation, Madison, Wis.

[21] Appl. No.: 456,032

[22] Filed: Dec. 22, 1989

Related U.S. Application Data

[63] Continuation of Ser. No. 243,073, Sep. 9, 1988, abandoned.

[51] Int. Cl.$^5$ ............................................. H02K 19/02
[52] U.S. Cl. ..................................... 310/162; 310/156; 310/261
[58] Field of Search ............... 310/156, 162, 163, 164, 310/169, 261

[56] References Cited

U.S. PATENT DOCUMENTS 4,110,646 8/1978 Rao ...................................... 310/163

FOREIGN PATENT DOCUMENTS 3506151 8/1985 Fed. Rep. of Germany ...... 310/162

OTHER PUBLICATIONS

S. Chandrasekhara Rao, "Dynamic Performance of Reluctance Motors with Magnetically Anisotropic Rotors," IEEE PES Winter Meeting & Tesla Symposium, New York, New York, Jan. 25-30, 1976.
S. Chandrasekhara Rao, "Steady State and Dynamic Performance of Anisotropic Reluctance Motor," Master of Science Thesis, Electrical Engineering, Newark College of Engineering, Newark, New Jersey, 1974.
A. R. W. Broadway, "Cageless Induction Machine", IEEE Proc. vol. 118, No. 11, Nov. 1971, pp. 1593-1600.
P. J. Lawrenson, et al., "Variable-Speed Switched Reluctance Motors," IEEE Proc., vol. 127, Part B, No. 4, Jul. 1980, pp. 253-265.
J. T. Bass, et al., "Development of a Unipolar Converter for Variable Reluctance Motor Drives," Conference Record IEEE IAS Annual Meeting, 1985, Nov.
W. F. Ray, et al., "High-Performance Switched Reluctance Brushless Drive," IEEE Transactions on Industry Applications, vol. 1A-22, No. 4, Jul./Aug. 1986, pp. 722-729.
M. R. Harris, et al., "A Review of the Integral-Horsepower Switched Reluctance Drive," IEEE Transactions on Industry Applications, vol. 1A-22, No. 4, Jul. 1986.

Primary Examiner—Steven L. Stephan
Assistant Examiner—Judson H. Jones
Attorney, Agent, or Firm—Foley & Lardner

[57] ABSTRACT

A high power density reluctance motor which is adapted to be supplied with unidirectional power from a converter has a multiphase stator with concentrated full pitch windings and multiple poles. The rotor has segments which constitute flux guides which serve to bend the flux produced by current flowing in a coil winding in a slot of the stator around the slot and back toward the periphery of the rotor, providing maximum inductance when a flux guide of the rotor is aligned with each such slot. Minimum inductance occurs when the flux guides are out of alignment with the slot conducting current and aligned with an adjacent slot, with a substantially linear change in inductance occuring with rotor displacment. The full pitch coils in each phase of the stator and the segmented rotor construction ensures that the entire air gap surface remains active, allowing greater torque to be produced than in a conventional switched reluctance motor and allowing the materials in the motor to work more efficiently under relatively mild electromagnetic stress. The motor can have few as two phases, with a two phase motor being drivable by a converter which has only two transistors switched to provide unidirectional current pulses to the two phases of the motor at the proper times to achieve motoring operation.

15 Claims, 11 Drawing Sheets

VARIABLE SPEED MACHINE WITH HIGH POWER DENSITY

This application is a continuation of U.S. application Ser. No. 07/243,073, filed Sept. 9, 1988, now abandoned.

TECHNICAL FIELD

This invention pertains generally to the field of electrical motors and generators, and more particularly to reluctance motors and electrical machines adapted to be driven by solid state converters.

BACKGROUND OF THE INVENTION

Although induction motor drives still are the workhorse of industry, the switched reluctance motor drive has been actively researched over the past decade with very promising results. The switched reluctance machine has a simple and rugged construction as well as very good overall performance over a wide torque-speed range. Recently, doubly-salient switched reluctance motors have been found to be an attractive alternative to more conventional synchronous and induction machines in low horsepower converter fed variable speed drive applications.

Because the current waveform of the switched reluctance motor must be carefully programmed to extract the maximum torque per ampere, this machine is more accurately termed a current regulated stepping motor (CRSM or CRS motor). The fundamental feature of this type of motor drive is that the CRS motor requires only a unidirectional current and thus the drive circuit topology and corresponding switching algorithm is greatly simplified. A detailed comparison of the CRS motor drive with a high efficiency induction motor drive has indicated that performance parameters such as torque per unit stator volume, torque per unit inertia and torque per unit copper weight, can be made equal to that of an induction machine, or in some cases, even exceed the induction machine. M. R. Harris et al., "A review of the Integral Horsepower Switched Reluctance Drive," IEEE Trans. Ind. Appl. Soc., Vol. IA-22, July/Aug. 1986, pp. 716-721.

While the recent work on CRS machines has yielded encouraging results, in several respects the machine is less than optimum. For example, taking an eight stator/six rotor pole ĊRS motor, with typical excitation of one of the four phases, only one quarter of the stator inner circumference is utilized to make a contribution to torque development at any instant. Secondly, the inductance variation of the occupying coils over each one fourth of the machine is limited by the so called double salient design. To have a comparable power rating to that of the conventional induction machine of the same size with such a limited air gap inner surface area, the CRS machine is designed to operate in a deeply saturated condition. The corresponding active material is thus under severe electromagnetic stress. It is apparent that any method of ensuring that the other three quarters of the inner circumference of the stator remain "active" would be a very significant step toward improving torque production and therefore, towards relaxing the severe electromagnetic stress and consequent iron losses in the active materials of the machine.

Electromechancial energy conversion in a CRS motor is accomplished by means of a time varying inductance due to the temporal variation of the rotor position. The switched reluctance motor typically has phase winding coils located on opposite sides of the stator and a multi-pole rotor. The poles of the rotor are brought into and out of alignment with the poles of the stator as the rotor rotates, periodically increasing and decreasing the inductance of the coils for each phase. In an idealized machine, the inductance varies with rotor angle as a form of triangular wave, with current being supplied by the converter to the phase coil during the time that inductance is increasing to obtain motoring operation. Generating torque is produced if the machine is excited during the interval in which the inductance of the winding is decreasing. Torque production is proportional to the square of the current and therefore independent of current polarity if mutual inductance is not involved. Hence, the windings can be excited with unidirectional currents.

In general, to maximize the torque for a given current in a CRS machine, the change in inductance as a function of rotor position should be maximized. However, in a conventional CRS motor, the ability to maximize the change of inductance with rotor position is limited. To maximize inductance, the stator pole should be completely aligned with the rotor pole but to minimize inductance the stator pole should be totally nonaligned with the rotor pole. In general, this requirement, and limitations imposed by leakage flux and the permeance of the main flux, result in a maximum achievable ratio of maximum inductance to minimum inductance of ten to one, when saturation is neglected. Another limitation, set by the small working area of the double salient structure, is that the permeability of cross section is strongly affected by the excitation level, which is detrimental to maximizing the ratio of maximum to minimum inductance. Thus, a significant improvement in the change in inductance with respect to rotor position in a CRS machine is not practical without increasing the number of poles, which unfortunately reduces the power output or speed of the machine or, conversely, requires very high switching frequencies in the associated power converter.

SUMMARY OF THE INVENTION

The present invention constitutes a new type of synchronous reluctance machine utilizing concentrated windings and unidirectional winding currents which has not only many of the advantages of the current regulated stepping (CRS) motor but significant performance advantages over the CRS motor. A motor in accordance with the present invention, having the same active air gap surface and the same amount of active copper at the rated output power as a CRS machine, will have copper losses that can be 75% of, and, under 140% rated power output, 55% of the comparable CRS motor. The improvement in copper losses in the synchronous reluctance motor of the invention is achieved using full pitch coils in each phase of the stator and a segmented rotor construction which ensures that the entire air gap surface remains active. Because the entire air gap is active during any interval of the torque production period, the corresponding active materials can work more efficiently under relatively mild electromagnetic stress. The machine of the invention utilizes careful regulation of the stator current to extract maximum torque, and may be denoted as a current regulated reluctance motor (CRR motor).

The machine of the invention includes a multi-phase stator having full pitch windings and multiple poles. The coils of various phases are wound in adjacent slots in the stator core. The segments of the rotor constitute flux guides which serve to bend the flux from the windings in each slot of the stator which are conducting current back toward the periphery of the rotor, providing maximum inductance in a coil when the rotor is aligned with each slot containing that coil and minimum inductance when the flux guides are out of alignment with the slot containing the coil winding. The rotor segments are preferably constructed so that the coil inductance changes substantially linearly with rotor displacement. The rotor segment flux guides may be formed of axially staked laminations of permeable iron sheets having a general arc shape. The number of rotor segments, each constituting a rotor pole, corresponds to the number of stator poles, twice the number of stator pole coils in each phase.

Current is supplied to the phase coils only during the time that the inductance in each phase coil is increasing, that is, during the time that the rotor pole segments are coming into alignment with the slots containing the phase coils which are being supplied with current. When the rotor pole reaches alignment with the slot conducting the current for the phase coil, the current in that coil is cut off, and the phase coil in the next adjacent stator slot is provided with current, causing the rotor to rotate to bring the rotor segments again into alignment with the slots containing the phase coils that are conducting current. The rotor thus rotates synchronously with the unidirectional current pulses provided to the phase coils. Because the rotor pole segments are not polarized, the direction of flux passing through the coils may change, and unidirectional currents may be provided to the stator coils so that the normal requirement for alternating current is not needed. Consequently, a very simple converter structure may be utilized. For example, for a two phase machine, it is possible to use only two transistor switches to switch the currents between the coils of the two phases. Because the rotor poles are not polarized, a continuous unidirectional torque can be maintained and, excluding saturation effects and assuming ideal switching of the currents, the torque may be substantially non-pulsating, in contrast to the typical torque pulsations encountered in conventional CRS machines.

Further objects, features, and advantages of the invention will be apparent from the following detailed description when taken in conjunction with the accompanying drawings.

DESCRIPTION OF THE PREFERRED EMBODIMENT

Figure 1:
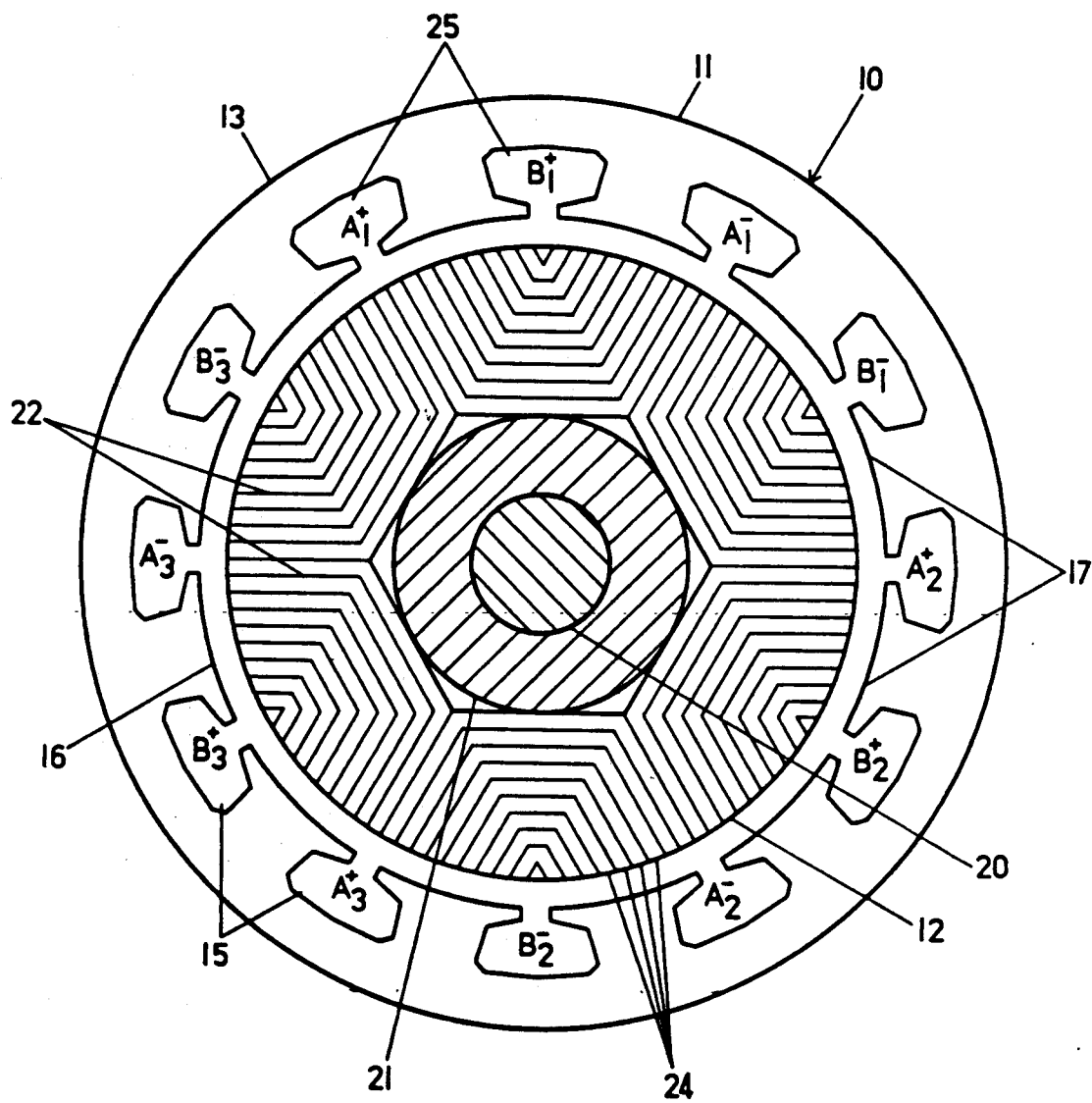
FIG. 1 is a somewhat simplified cross sectional view through the rotor and stator assembly of a six pole current regulated reluctance motor in accordance with the present invention, illustrating the segmented rotor structure with axial laminations.

With reference to the drawings, a somewhat simplified cross sectional view of the current regulated reluctance motor of the present invention is shown generally at 10 in FIG. 1, illustrating the cross section of the stator 11 and the rotor 12. The stator 11 has a core 13 formed in a conventional manner, for example of plural laminations of permeable iron, with twelve slots 15 evenly spaced about the cylindrical inner periphery 16 of the stator core. Pole pieces 17 are defined by the stator core between the slots 15. The rotor 12 is mounted for rotation on a shaft 20 (supported by end bearings, not shown, in a conventional manner), and has a cylindrical support core 21, which may be formed of relatively less permeable steel, and several rotor pole segments 22, which act as flux guides, which are bolted to the support core 21. The pole segments 22 are preferably formed of axially laminated soft iron sheets (represented by the lines labeled 24 in FIG. 1), having a general arc shape, sandwiched with nonmagnetic material (e.g., epoxy). Examples of similar rotor constructions which may be appropriately modified for use herein are shown in the article by A.R.W. Broadway, "Cageless Induction Machine," IEE Proc. Vol. 118, No. 11, Nov. 1971, pp. 1593–1600, and in U.S. Pat. No. 4,110,646, issued Aug. 29, 1978, the disclosures of which are incorporated herein by reference.

Each of the rotor segments 22 is formed generally in an arc which serves to bend the flux from the windings in each slot of the rotor coil around the winding in such slot from one of the pole pieces on one side of the winding to the pole piece on the other side of the winding. The rotor segments 22 are thus sized and shaped to span the arc between slots carrying current for one coil in each phase of the stator windings. In the machine shown in FIG. 1, each stator slot 15 contains the windings 25 for a single coil in one phase of the stator winding. The machine 10 illustrated in FIG. 1 is a two phase machine having six poles, the phases being denoted A and B, with the phase windings labeled $A_1$, $A_2$, $A_3$ and $B_1$, $B_2$ and $B_3$. A "+" sign next to the letter for the phase indicates that the current is flowing in the coil out of the plane of the paper and a "−" sign next to the letter representing the phase indicates that the current is flowing into the plane of the paper. The three coils $A_1$, $A_2$ and $A_3$ are connected in series, as are the coils $B_1$, $B_2$ and $B_3$. The electrical connections to the machine for these coils are not shown, nor are the portions of the coils shown which span across the ends of the stator core, as such connections are conventional and well known in the art.

The stator windings are fully pitched. To distribute the load, the machine can be designed with any number of phases. However, a two phase current regulated reluctance machine is most analogous to the 8/6 pole CRS motor, and results in the lowest losses. The phase windings are designed to carry unidirectional currents in the same manner as a conventional CRS machine.

Figure 2:
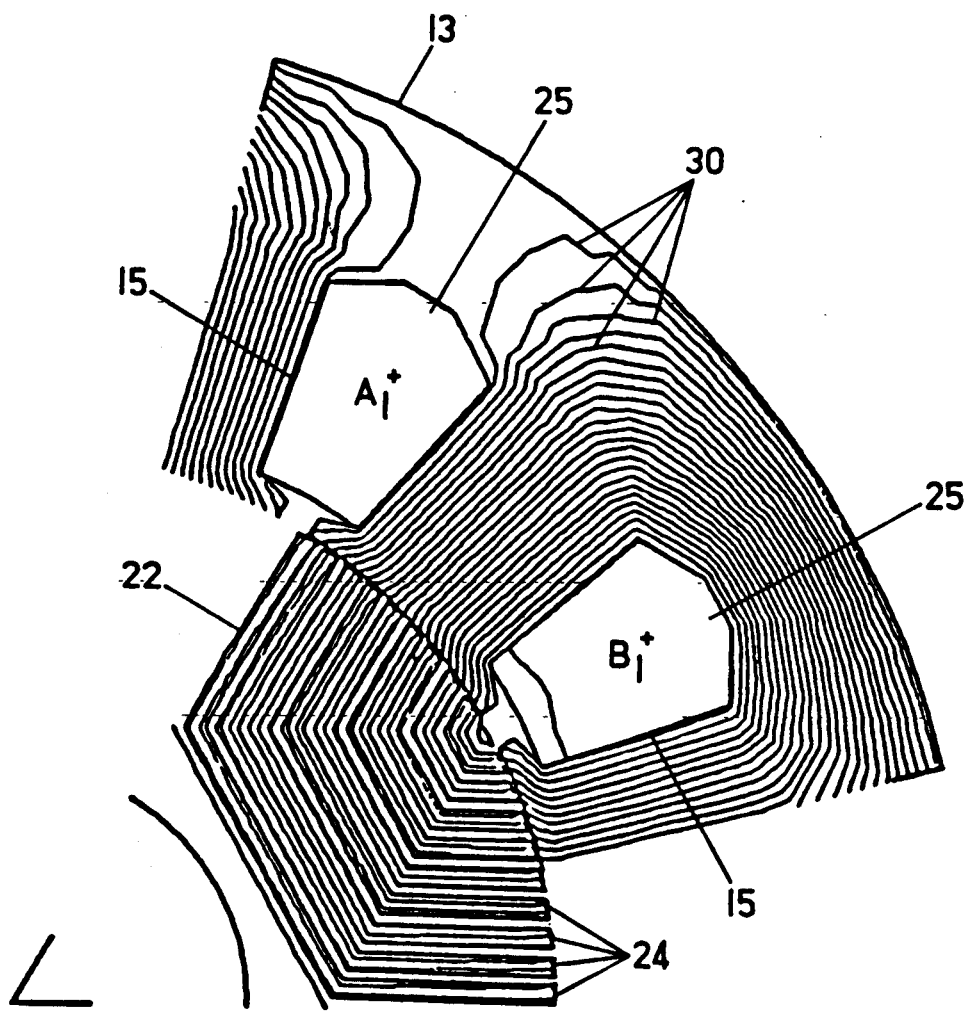
FIG. 2 is an illustrative finite element plot of flux distribution in the current regulated reluctance motor for the aligned or maximum inductance position.
Figure 3:
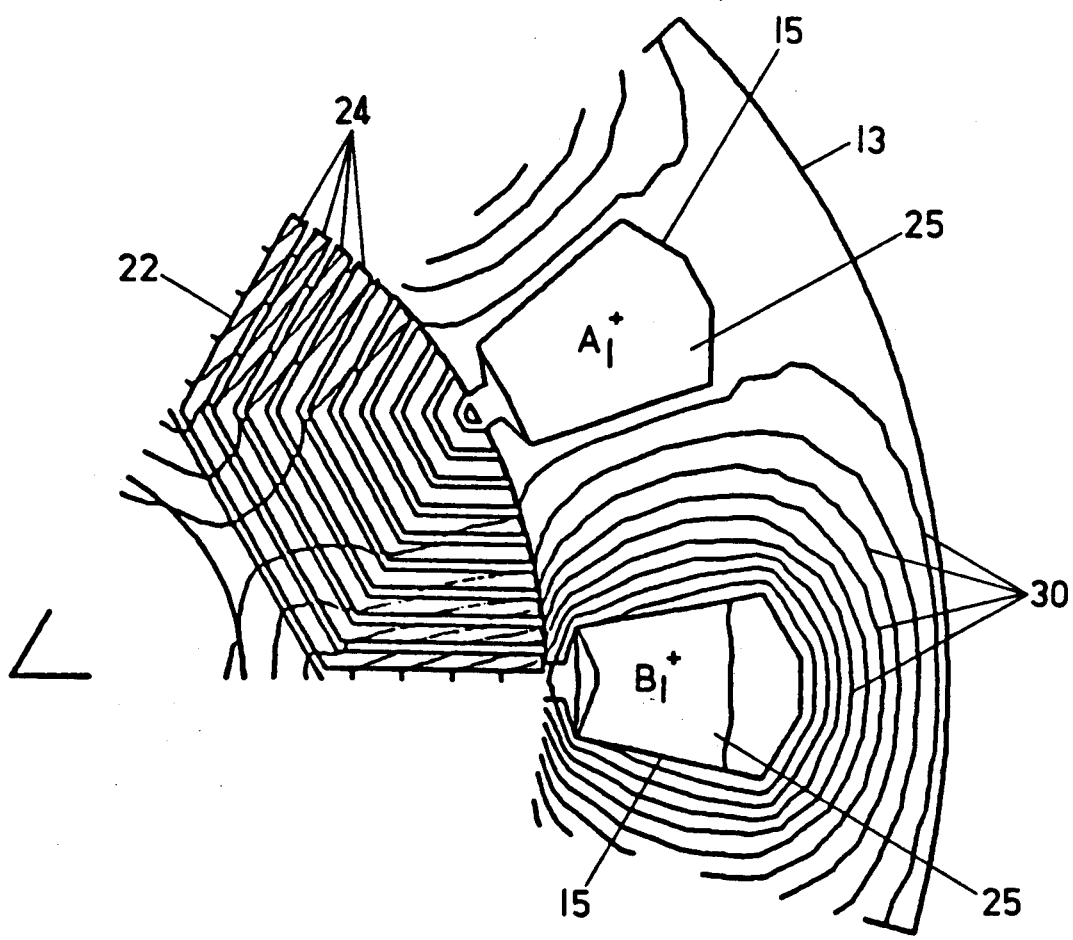
FIG. 3 is a finite element plot of the flux distribution of the current regulated reluctance motor for a typical unaligned or minimum inductance position.

The manner in which the variation in reluctance as a function of angular position of the rotor occurs in the machine 10 is best illustrated in the views of FIGS. 2 and 3. FIG. 2 is a simplified cross section view showing the stator core 13 and one of the rotor pole segments 22 at a position where it is aligned with the slot 15 containing the coil for pole 1 of phase B, conducting current $B_1+$, to provide maximum flux linkage and thus maximum inductance for the phase coil $B_1$ at this point in time. It is understood that another of the rotor segments 22 would also be similarly aligned with the other side of the phase coil $B_1$, conducting the current in the opposite direction ($B_1$). Illustrative lines of flux 30, calculated using a finite element method, graphically illustrate the flux linkage. FIG. 3 illustrates the flux distribution when the rotor has moved to align the rotor pole segment 22 with the next adjacent slot, carrying the current $A_1+$ for the pole 1 of phase A, and being maximally unaligned with the coil carrying the current $B_1+$. As illustrated in FIG. 3, much less of the flux, represented by the lines 30, links the coil winding carrying the current $B_1+$ at this position of the rotor, and the self inductance of the coil $B_1$ is at its minimum. The change in flux linkage with change in rotor position occurs substantially linearly.

As will be apparent from reviewing FIG. 1 in conjunction with FIGS. 2 and 3, the change in flux distribution which occurs with the rotation of the rotor an angular distance equal to one slot of the stator, illustrated for the phase winding $B_1+$ in FIGS. 2 and 3, also occurs for all of the other phase B windings.

From the foregoing graphical illustrations, it is apparent that the current regulated reluctance motor of the present invention distributes the flux through the rotor and stator iron core materials in an even manner, minimizing localized flux saturation as compared to current regulated stepping motors (switched reluctance motors). In addition, substantially the entire periphery of the rotor takes part in sharing the flux and contributing to producing torque for the machine when one of the phases is provided with current, in contrast to the CRS machine where substantially only one quarter, or at most, one half, of the machine takes part in producing torque. To increase performance even further, the laminations 24 of the rotor, can be made with oriented iron or steel to increase permeability in the desired fashion and reduce leakage flux.

Figure 4:
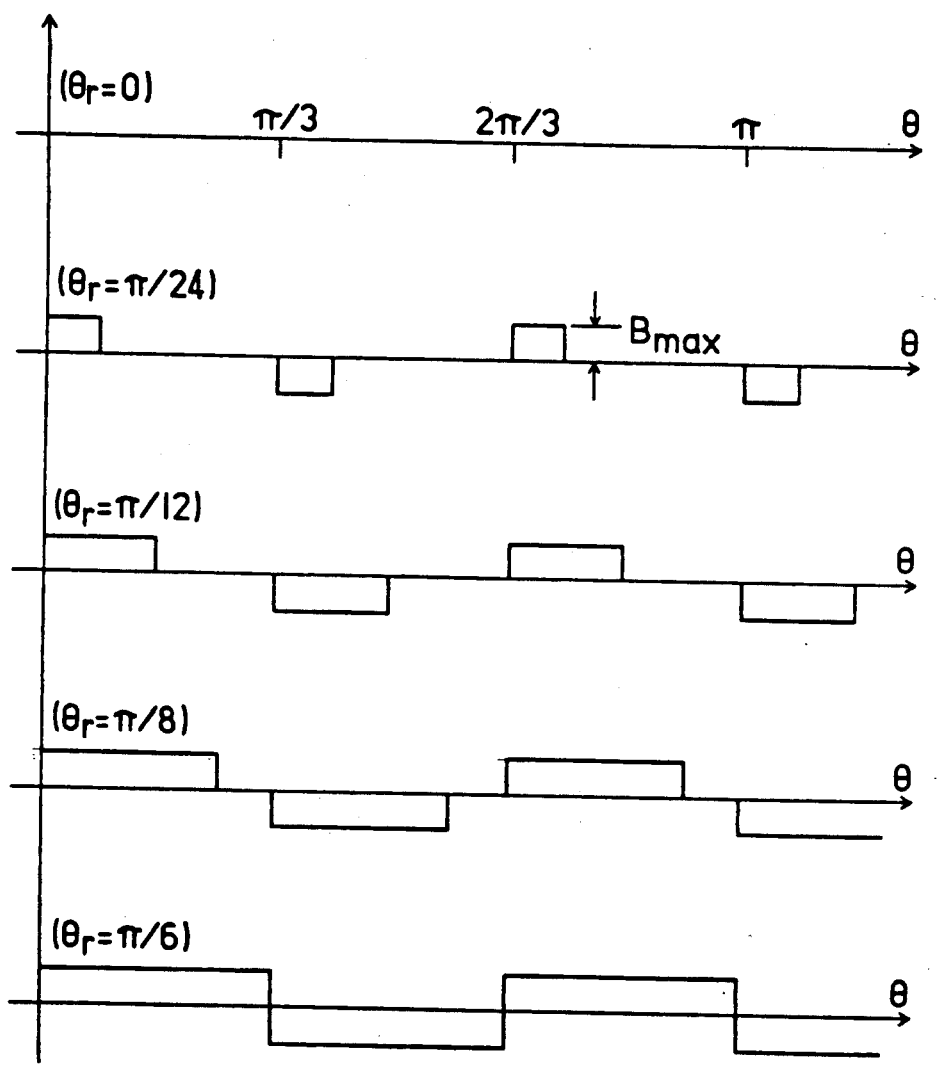
FIG. 4 is a plot showing the idealized air gap flux distributions for various rotor positions in the motor of FIG. 1.

Although the current regulated reluctance machine (CRR) of the present invention can be shown to develop as much as two times the torque of a CRS motor with the identical physical size, the flux in the motor for different moments of operation still retains desirable characteristics. FIG. 4 depicts the air gap flux distributions for the machine 10 for the rotor angle $\theta_r = 0°$, $7.5°$, $15°$, $22.5°$ and $30°$. Because there is no current overlap between the phases, the flux at any moment is produced by a single phase current only. It may be observed concerning the flux distribution around the air gap that the total flux linkages increase linearly with the rotor position from 0° to 30°, but the magnitude of the flux density at any point is always two thirds of that of the equivalent CRS motor. In addition, the fundamental frequency variation of the flux pattern is reduced to half of that in the CRS motor. While the flux density in the motor of the present invention is reduced to two thirds of that in a CRS motor, the increased span of the coils keeps torque production high. Such a mode of operation has important side benefits since the iron losses in the motor are significantly reduced due to a reduction in both the frequency and magnitude of the flux density. In addition, since the flux density is 33% lower in the equivalent CRR machine of the present invention than in the conventional CRS machine, saturation will affect the torque production capability of the present machine significantly less than prior CRS machines. Other advantages of operating the motor with low frequency flux variation are: high speed capability due to the low ratio of switching frequency to speed, less number of switches required in the power converters, a reduction of losses associated with the switching frequency, and, since the flux density of the rotor is non-alternating, the rotor can be constructed with grain-oriented steel, further reducing the iron losses.

Figure 5:
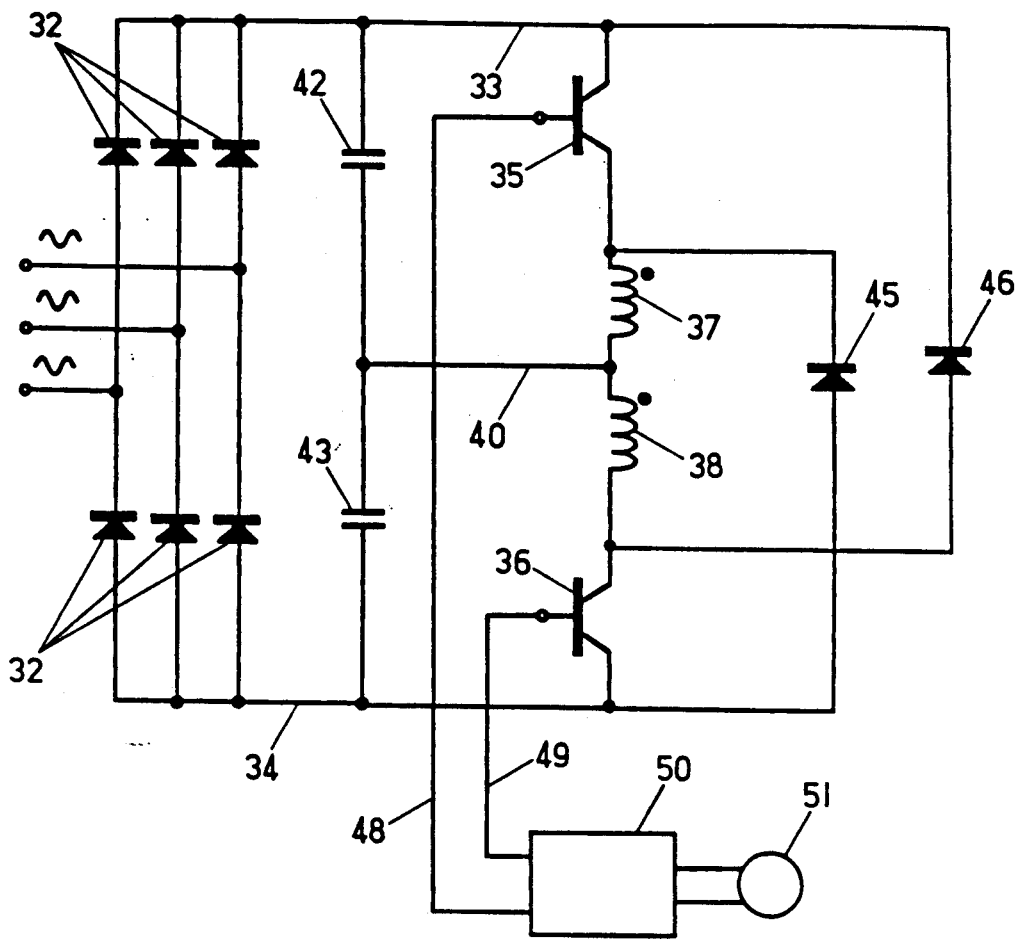
FIG. 5 is a schematic circuit diagram showing an exemplary power converter for the current regulated reluctance motor which utilizes two transistor switches.

Several converter arrangements are possible to power the machine of the present invention. One of the simplest, using a split DC bus and only two transistors, one for each of the two phase windings, is shown in FIG. 5. The AC power is rectified by a bridge composed of diodes 32 and supplied on DC bus lines 33 and 34 to the converter which includes switching transistors 35 and 36. The phase A coils 37 and the phase B coils 38 are connected between the transistors 35 and 36, respectfully, and a common return bus 40 which returns power to the DC lines 33 and 34 through capacitors 42 and 43. A feedback diode 45 is connected between the line 34 and the connection between the transistor 35 and the phase A coils 37, and another feedback diode 46 is connected between the DC line 33 and the connection between the transistor 36 and the phase B coils 38. The triggering signals are provided to the bases of the transistors 35 and 36 on lines 48 and 49 from a controller 50 which has a sensor 51 which monitors the angular position of the shaft of the machine to provide triggering pulses to the transistors 35 and 36 at the proper times to obtain motoring operation.

Figure 6:
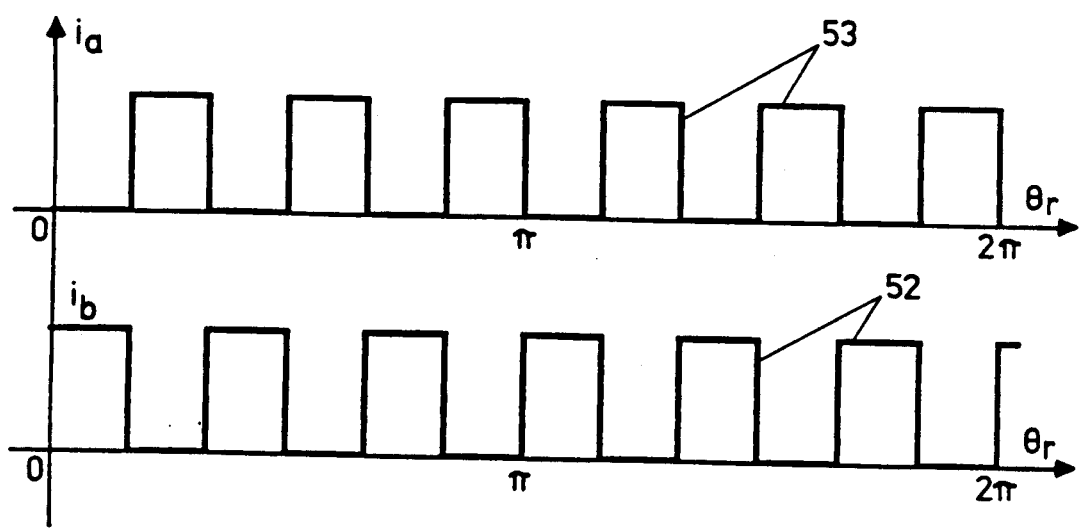
FIG. 6 are illustrative plots showing the phase current wave shapes for both phases of a two phase current regulated reluctance motor as a function of rotor position.

The desired wave shapes of the currents provided to the phase A and phase B windings are illustrated in FIG. 6 as a function of the angular position of the rotor. Current is applied to the phase windings during the time inductance is increasing to obtain motoring operation. The phase B current, represented by the graph 52, consists of a series of pulses which are entirely out of phase with the phase A currents, represented by the graph 53 in FIG. 6. These currents are, in effect, unidirectional blocks of current with a duration of 90° electrical, and occur with two pulses per cycle. Since the flux in each coil is a pulsing DC quantity, the rotor poles encounter an AC flux variation during rotation. However, because the rotor poles are not polarized, a continuous unidirectional torque can still be maintained and, excluding saturation effects, the torque is a non-pulsating quantity.

Figure 7:
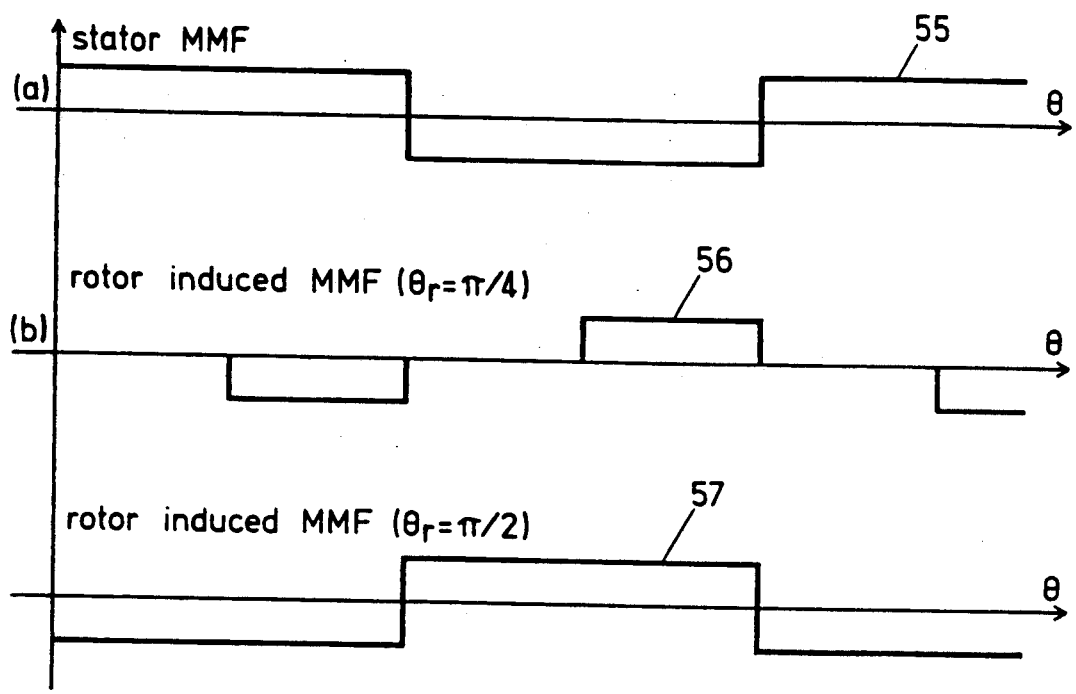
FIG. 7 are plots showing stator MMF and induced rotor MMF of a current regulated reluctance motor as a function of rotor position.

The operation of the machine in the present invention can be analyzed by the "rotor induced MMF" method. The stator MMF is as shown in the graph 55 of FIG. 7, illustrating the stator MMF as a function of rotor position $\theta_r$. It may be noted that the induced rotor MMF, represented by the graph 56 in FIG 7, depends not only on the wave form of the stator MMF but also on the position of the rotor with respect to the stator winding. As an extreme case, if the rotor position $\theta_r = 90°$, as illustrated by the graph 57, the induced MMF will have an identical waveform to that of the stator with opposite polarity, which is extremely useful for the purposes of maximizing the change in inductance with respect to the stator angle change.

Assuming that the air gap flux is produced by the effective MMF, which is a summation of stator MMF and rotor induced MMF, and if the air gap length is uniform, then winding function theory can be very conveniently employed to compute the inductance. According to winding function theory, the inductance for a given coil can be calculated as:

$$L_{aa} = \frac{\mu_o r l}{g} \int_0^{2\pi} F_{au}(\theta_r, \theta) N(\theta) d\theta$$

where $F_{au}(\theta_r, \theta)$ is the effective MMF distribution created by a unit current in a given stator winding and $N_a(\theta)$ is the winding function expressing the stator coil distribution as a function of the angular measure across the air gap. In the general situation, the stator may be equipped with multi-phase windings. In this case the approach described above can be generalized to compute all self and mutual inductances.

Figure 8:
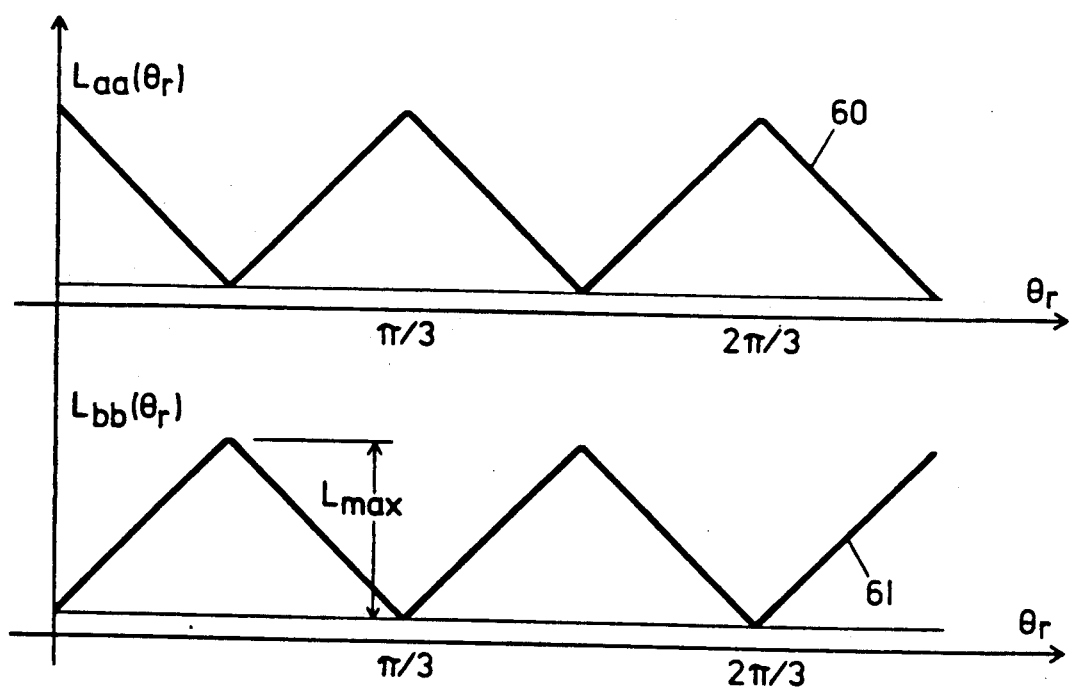
FIG. 8 are illustrative plots showing the self inductance of the stator windings for a two phase current regulated reluctance motor.

The results of the inductance calculation for the motor 10 having a six pole rotor with two phase stator windings mutally displaced by 90° is shown in FIG. 8. The rotor position $\theta_r$ with respect to phase winding A is 90° electrical for the case shown and the rotor is assumed to move in the direction of increasing $\theta_r$. The self inductances $L_{aa}$ and $L_{bb}$ calculated by winding functions when the rotor moves from 0° to 120°, are shown as the graphs labeled 60 and 61, respectively. It can be observed that the iron cross section of the coils in the machine of the present invention can be many times that available in double salient designs for conventional CRS machines, and thus the $L_{max}$ value in each coil will clearly be many times that of a comparable CRS winding. It should be noted that these computations are idealized in two respects. First, when the rotor is at the extreme position ($\theta_r = 30°$), it is assumed that there is no leakage flux at all. This idealization results in $L_{min}$ being 0. Secondly, it is assumed that the magnetic material works in the linear region only and the reluctance in the iron is 0. Hence, $L(\theta_r)$ is only a function of rotor angle. In reality these assumptions are not true. Nonetheless, these idealizations will not affect the general conclusions since it is the difference between Lmax and Lmin that contributes to torque production.

A comparison can be made of a prototype current regulated reluctance (CRR) motor of the present invention and a conventional CRS motor to illustrate difference in performance characteristics. The following assumptions can be made for purposes of the comparison. First, the motors have the same stator inner diameter, the same length of the iron stack and the same length of air gap. Second, the number of rotor poles are the same for both motors. Third, both motors have the same total number of turns of stator windings and the wire gauge is the same, therefore the two machines have the same amount of active copper weight. Fourth, each stator phase winding has the same current, and because of the assumption above, the same current density. Fifth, the CRS machine has eight stator coils and the current regulated reluctance machine has twelve. The magnetic materials in both motors work in a linear region. Seventh, consistent with manufacturing experience, the ratio Lmax/Lmin is assumed to be ten and five for the CRS motor and the current regulated reluctance motor respectively.

Based on the first six assumptions, it immediately follows that the turns per coil and the MMF produced by a coil in a two phase, six pole current regulated reluctance motor is two thirds that in a four phase, eight pole CRS motor. The flux density in a current regulated pole CRS motor is thus two thirds that in a CRS motor. Because both motors have the same number of rotor poles, each coil in both motors is excited six times for each revolution of the motor. The period for excitation in each coil in a CRS motor is 15° and is 30° for a current regulated reluctance motor.

For convenience, it will be assumed that during the exciation period the coil inductance is a linear function of rotor position $\theta_r$. Then the torque equation can be written in the form:

$$T = \frac{i^2}{2} \frac{L_{max} - L_{min}}{\Delta \theta_r}$$

where $L_{max}$ and $L_{min}$ are the inductances in the maximum and minimum inductance positions respectively and $\Delta \theta_r$ is the swept rotor angle over which this inductance variation takes place.

$$K_L = 1 - \frac{1}{L_{max}/L_{min}}$$

The torque can be then be written as $$T = \frac{i^2}{2} \frac{k_L L_{max}}{\Delta \theta_r}$$

The inductance can be expressed as $$L_{max} = \frac{\mu_o l r \theta_o N^2}{2g}$$

where
$\mu_o$ = permeability of air
l = length of the stack
r = radius of the rotor
$\theta_o$ = pole arc of one stator pole
g = length of airgap
N = # of turns per coil
Substituting the average torque contributed by a single coil in one rotor revolution, is therefore, $$T_{(ave)} = \frac{3}{\pi}\left[\frac{i_i^2}{2\pi} \frac{m\mu_o r N^2 \theta_o}{2g}\right]$$

It is important to note the difference between the instantaneous torque and the average torque which is independent of the incremental rotor angle $\theta r$. Taking the number of phases and number of circuits per phase into account, the total average torque produced by the machine is $$I_{(ave)} = mC\left[\frac{3i^2}{2\pi} \frac{k_L\mu_o lr N^2 \theta_o}{2g}\right]$$

where
m = number of phases
C = number of circuits per phase.

For purposes of comparison, it is convenient to simply denote all quantities associated with CRS motor by the subscript "1" and those of the CRR motor by "2". Therefore, a torque ratio expressing the degree of improvement of the CRR motor relative to the CRS motor can be written as:

$$\tau = \frac{T_{2(ave)}}{T_{1(ave)}} = \frac{m_2 C_2 K_{L2} N_2^2 \theta_{o2}}{m_1 C_1 K_{L2} N_1^2 \theta_{o1}}$$

where we have already made use of the fact that $i_1 = i_2$.

This expression clearly indicates the importance of the iron cross sectional area spanning the coil i.e., the importance of $\theta_o$. From the seven assumptions above, we have $N_2 = 0.67 N$   $N_1 = N$
$m_2 = 2$   $m_1 = 4$
$C_2 = 3$   $C_1 = 1$
$k_{L2} = 4/5$   $k_{L1} = 9/10$
$\theta_{o2} = 60°$   $\theta_{o1} = 18°$ Upon evaluation of the torque ratio equation above using the foregoing parameters, the torque ratio between the CRR motor and CRS motor becomes $\tau = 1.997$ Hence, with the identical frame size and active copper weight, the CRR motor will develop twice as much torque as that of the CRS motor. That is, the power density of a CRR motor will be twice that of a CRS motor.

It is important to note that the improvement in output torque does not come without a commensurate increase in the copper losses. Since the pole pitch of each stator winding embraces one fourth of the stator inner circumference, the end winding portion of the windings of the CRR machine are proportionately larger, contributing, in turn, to high copper losses. It can be readily verified that the ratio of the resistances for the two machines can be expressed as $$\frac{R_2}{R_1} = \frac{L + \frac{\pi}{6} r}{L + \frac{\pi}{8} r}$$

where L is the length of the coil in the axial direction. For a machine rated at 7.5 Kw the ratio of resistance of the CRR to CRS machine can be shown to be $R_2/R_1 = 2.2$ Hence, for the same current in the windings of the two machine, the torque of the CRR machine is double that of the CRS machine. However, the copper losses increase as well by a factor of 2.2. In general this ratio typically takes values from 2.0 to 2.5 depending upon the aspect ratio. Therefore, while the new CRR machine is capable of high power density, it appears that the CRR motor is not more efficient than the CRS machine if saturation is ignored. It can be recalled that to extract a practical amount of power from the stepping (CRS) motor, the machine must be driven deeply into saturation, which is not necessary in the CRR machine.

Figure 9:
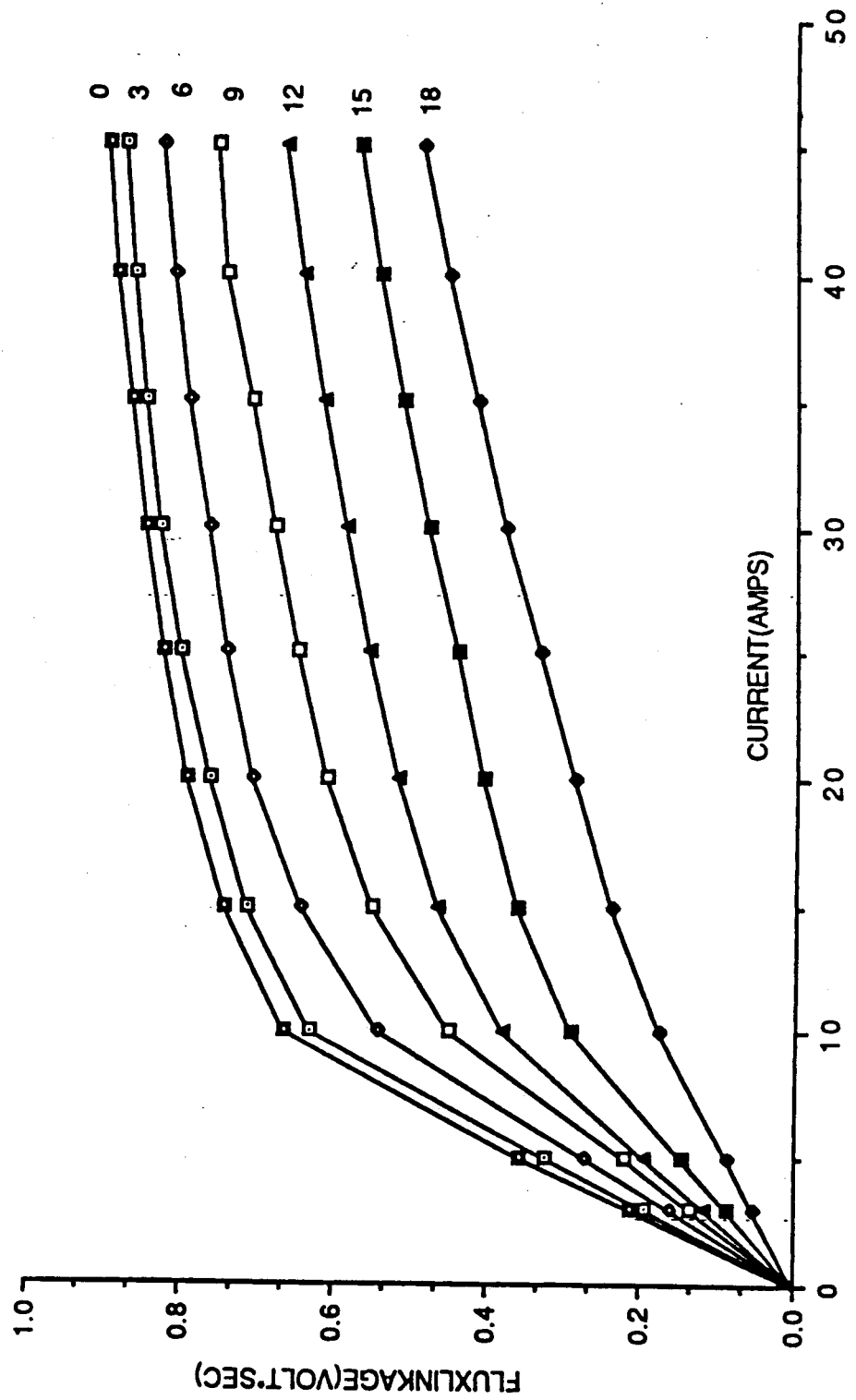
FIG. 9 is an illustrative graph showing several exemplary plots of flux linkage versus current for a conventional 8/6 pole current regulated stepping motor.
Figure 10:
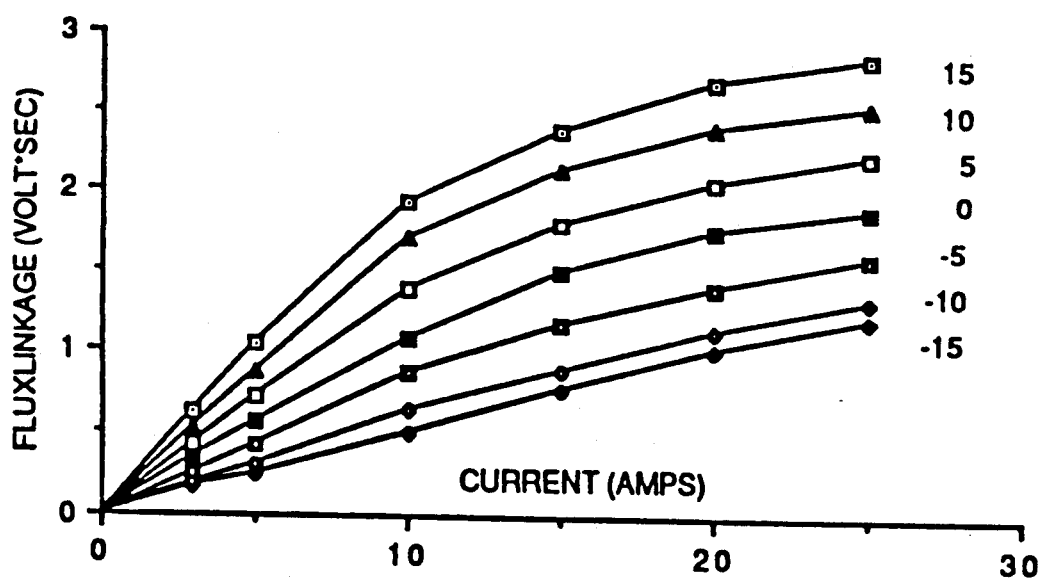
FIG. 10 is an illustrative graph showing several exemplary plots of flux linkage versus current for a six pole current regulated reluctance motor in accordance with the present invention.

FIGS. 9 and 10 show families of flux linkage-current curves for the CRS and CRR motors, respectively, at various rotor positions obtained from 120 finite element plots. These curves show the "bulk" saturation effect of the two motors. It is important to note that these two motors saturate at quite different flux linkage levels. Also, the flux linkage variation with respect to the rotor positions at the same excitation level are different. The implication of the different saturation level and the characteristics of these two families of flux linkage-current curves will be discussed in length later.

The average torque production is evaluated by calculating the rate of coenergy variation due to the rotor rotation, this is $$T_{(ave)} = \frac{\Delta E}{\Delta \theta_r}\bigg|I = \text{const}$$

where $\Delta E$ is the coenergy variation corresponding to the variation of rotor angle displacement $\Delta\theta_r$ in mechanical degrees under constant excitation current. The angular displacement $\Delta\theta_r$ for the CRS motor is from 0 to 18 mechanical degrees as shown in FIG. 9, and for the CRR motor is from 0 to 30 mechanical degrees as shown in FIG. 10.

Figure 11:
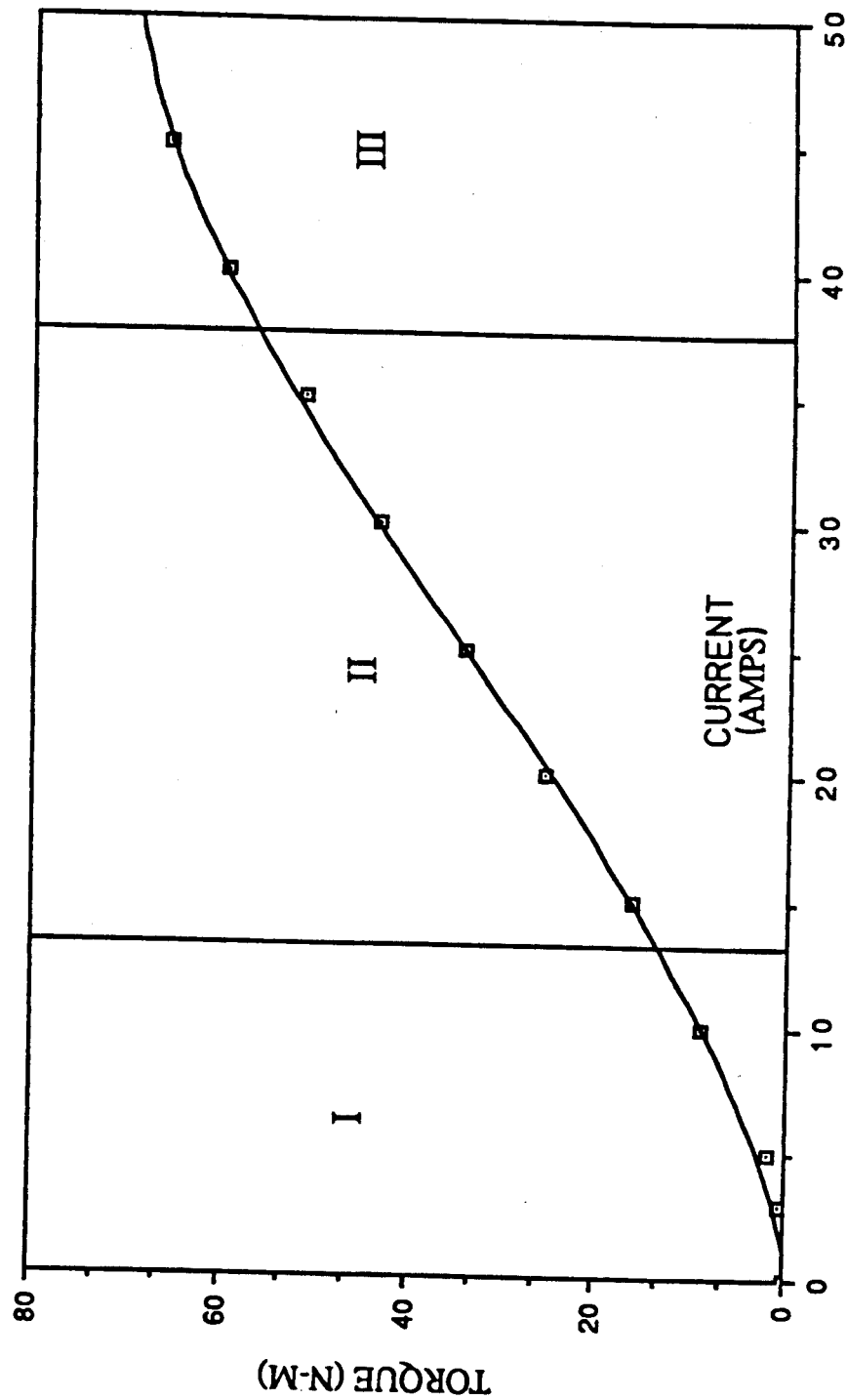
FIG. 11 is an illustrative graph showing torque versus current for a conventional 8/6 pole current regulated stepping motor.
Figure 12:
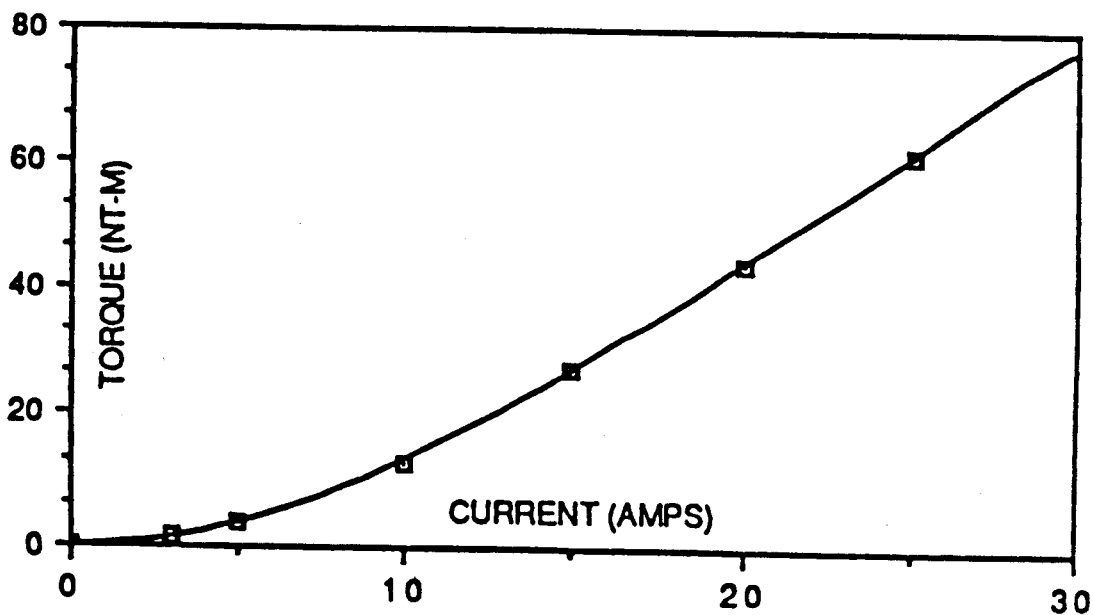
FIG. 12 is an illustrative graph showing torque versus current for a six pole current regulated reluctance motor in accordance with the invention.

The current-torque relations, computed from FIGS. 9 and 10, are plotted in FIGS. 11 and 12. In computing FIGS. 11 and 12 it was assumed that the motor currents retain their ideal waveforms. In contrast to the linear model in which the torque derived is proportional to the square of the current, the computed torque capability can be divided into three regions depending on the excitation level. Taking the current-torque curve for the CRS motor as an example, in region I (relatively unsaturated) the torque is indeed proportional to the square of the current. However, in the middle region II the torque is only linearly proportional to the current because the iron of the motor has entered the saturation region but the flux is still well confined by the path provided by the rotor iron. In the last region III, not only is the iron deeply saturated but also the flux linkage does not follow the path provided by the rotor iron and the leakage flux becomes dominant. Under such circumstances, the flux linkage varies in less than a linear fashion and, consequently, so does the torque production. It is apparent that the saturation of reluctance type motors is crucial to the overall performance and must be adjusted correctly.

Figure 13:
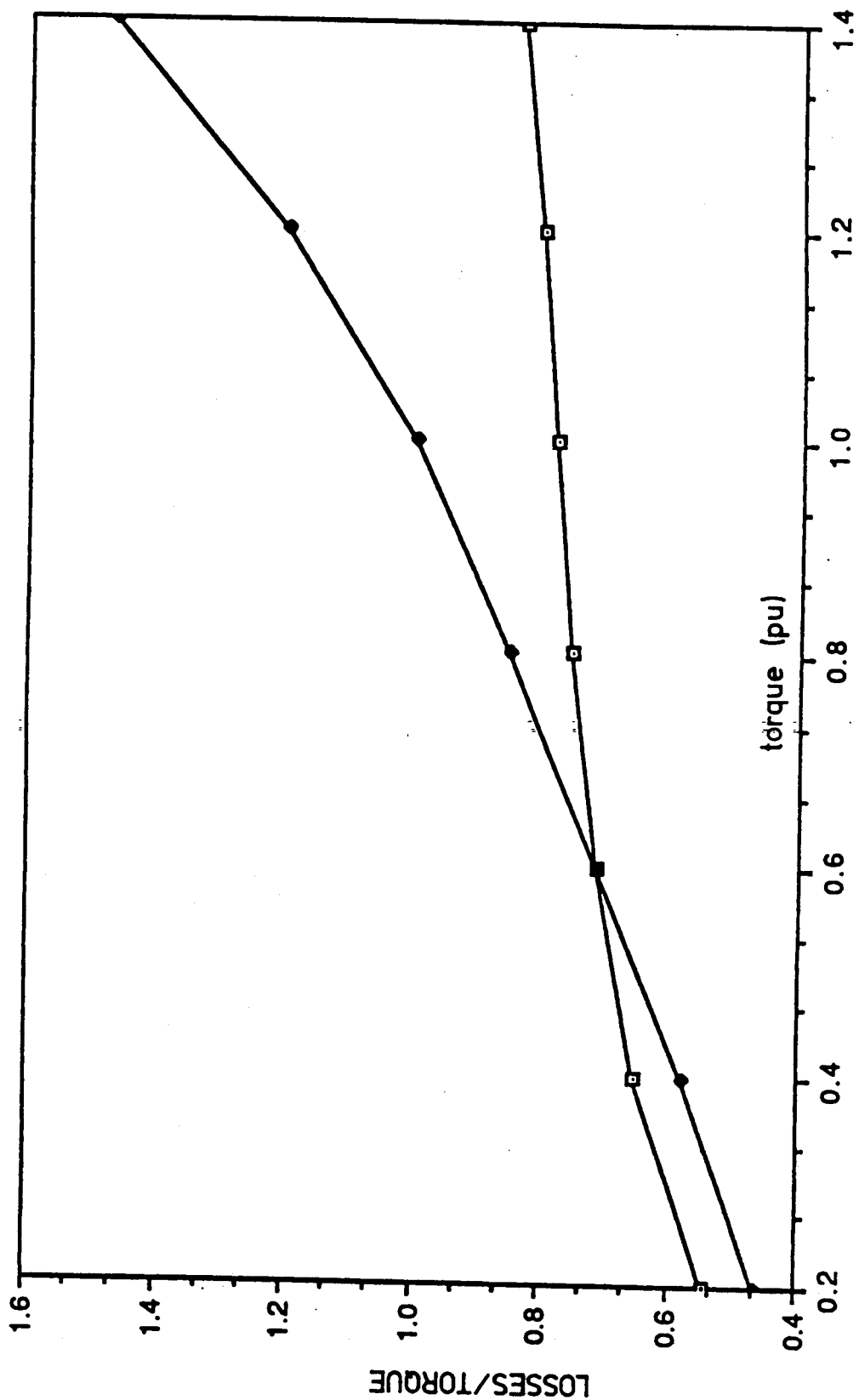
FIG. 13 is a graph showing plots of copper loss/torque ratio versus per unit electromagnetic torque for a conventional 8/6 pole current regulated stepping motor and for a six pole current regulated reluctance motor in accordance with the invention.

It is well known that the CRS motor is a type of copper-loss dominant motor. Since the copper losses are proportional to the square of the current, then the motor should operate in a current vs. torque region such that the ratio of copper-loss/torque is near its lowest possible value. Since both the CRS and CRR motors are assumed to have the same physical size and operating speed, it is reasonable to take the ratio of copper losses to torque as a criterion and evaluate this parameter at various torque values for comparison. Using the torque production curves obtained by the finite element method, the ratio $I^2R/T_e$ can be calculated and normalized by the rated value of the CRS motor for both motors where $I^2R$ is the total copper losses and $T_e$ is the corresponding electomagnetic torque. The resultant $I^2R/T_e$ curves for the CRS and CRR motors are obtained and plotted in FIG. 13. The torque range evaluated is from 0.2 to 1.4 times that of the CRS motor. It is clear that at low output torque levels the copper losses of the CRR motor are slightly higher than that of the CRS motor as also predicted by the linear analysis of the previous section. At a medium torque level, however, the difference between the CRS and CRR machines becomes evident. At the rated torque value, the copper losses of the CRR motor is 75% of, and at 140% rated torque is 55% of that of the CRS motor. Hence, with essentially the identical frame size and active copper weight, the CRR motor will have a higher efficiency than that of CRS motor under the rated power condition. This result may be interpreted in an alternative way. That is, if the copper losses of the CRS and CRR motors are the same, the CRR motor will then develop more torque than the CRS motor.

This conclusion can also be understood by physical inspection of the CRS motor and CRR motor operation. It should be noted that during each energy conversion period, the CRS motor only has one quarter of the inner circumference of the stator making a contribution to torque production. As the current increases, the output power increases and so does the copper losses. However, when the CRS motor is at high power levels, the copper losses continue increasing proportionally to the square of the current while the increase of the torque production is dramatically reduced by the iron saturation. The CRR motor, with its dedicated rotor and stator design, results in the entire airgap surface being active under very mild electromagnetic stress on the corresponding materials even at relatively high output power level. Therefore, it is not surprising that for medium power levels and above, the CRR motor converts energy more efficiently, or, for the same amount of copper losses, the CRR will convert more energy for the same rotor speed.

Although the CRR motor has significantly reduced copper losses with the same physical size at or above the rated power level, the flux distribution in the machine still retains desirable characteristics. First, the magnitude of the flux density is dramatically reduced since the MMF is distributed along the entire airgap circumference. Secondly, the fundamental frequency of the variation of the flux pattern is reduced to one half that in the CRS motor since for each 60° of rotor rotation the converter switches only two times instead of four times as in the equivalent CRS motor. The reduction of both magnitude and frequency of the flux variation in the CRR motor serves to decrease the iron losses of the machine.

Other advantages of the current regulated reluctance motor are the following:

(1) With proper control, a two phase motor can develop starting torque of either polarity and rotate in either direction. This is in contrast to a two phase (four pole stator/two pole rotor) CRS motor which is well known to be incapable of developing reliable starting torque. Starting can be accomplished by applying current to both phases, moving the rotor to an intermediate position, and then applying a current pulse first to the phase winding that lies in the direction in which the rotor is to turn. Thereafter the rotor can be brought up to speed in a normal manner synchronous with the current pulses.

(2) While a two pole rotor CRS motor will not develop starting torque, a two phase CRR motor can be designed with any (even) number of poles. Hence, this new machine offers improved high speed, high horsepower capability due to the low ratio of switching frequency to rotor speed.

(3) Since only two phases are required, the motor requires only two self commutated switches in the power converter. This is in contrast to the CRS motor which typically requires 4 switches for a four phase 8/6 pole design or 6 switches for a three phase 6/4 pole design.

(4) Since the switching frequency is reduced by half compared to an equivalent CRS motor with the same number of rotor poles, iron losses associated with the switching frequency are reduced.

(5) Since the flux density in the rotor is almost entirely in the plane of the laminations and also normal to the axial direction, the rotor can be constructed with grain-oriented steel, thereby further contributing to a reduction in the iron losses.

It is understood that the invention is not confined to the particular embodiments set forth herein, but embraces all such modified forms thereof as come within the scope of the following claims.

What is claimed is:

1. A reluctance machine adapted for variable speed drive, comprising:
(a) a stator including a core, and windings supported thereon formed of multiple coils, the windings having full pitch, plural poles and plural phases;
(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles.

2. A reluctance machine adapted for variable speed drive, comprising:
(a) a stator including a core, and windings supported thereon formed of multiple coils, the windings having full pitch, plural poles and plural phases, wherein the stator core includes a plurality of slots formed therein, and the stator winding has a plurality of phase coils, each phase coil composed of a full pitch winding disposed in two stator slots;

(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles.

3. The machine of claim 2 wherein the coil winding constituting each pole of a phase is wound in two slots of the stator core which are separated by a number of slots equal to the number of other phases, with the coils of the other phase or phases occupying the slots separating the two slots occupied by the coil.

4. A reluctance machine adapted for variable speed drive, comprising:

(a) a stator including a core, and windings supported thereon formed of multiple coils, the windings having full pitch, plural poles and plural phases;

(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles, wherein the means for guiding the flux causes the inductance of each stator coil to change substantially linearly from minimum inductance to maximum inductance.

5. The machine of claim 3 wherein the means for guiding flux in the rotor segments comprises a stack of axially laminated iron sheets sandwiched together with nonmagnetic material and bent in a configuration to guide the flux around each portion of a stator winding which is conducting current and resulting in a substantially linear change in inductance with rotor position.

6. A reluctance machine comprising:

(a) a stator having a core with a cylindrical periphery and a plurality of slots formed therein, a stator winding having a plurality of coils forming a plurality of phases and poles, each phase coil composed of a concentrated full pitch winding disposed in two slots of the stator which are separated by a number of slots equal to the number of other phases, with the coils of the other phase or phases occupying the slot or slots separating the two slots occupied by each coil;

(b) a rotor having a plurality of rotor pole segments which are equal to the number of poles of the stator, each rotor segment comprising a flux guide of highly magnetically permeable material formed in a substantial arc shape to direct magnetic flux from the rotor periphery at one side of the flux guide to the rotor periphery at the other side of the flux guide, each rotor segment sized to span the arc between the stator slots containing the coils for each phase, thereby guiding the flux produced by current flowing in a coil winding in one slot around that slot to maximize the inductance of that coil when the center of the rotor segment flux guide is aligned with the slot through which current is flowing and to minimize the coil inductance when the rotor segment flux guide is aligned with a slot adjacent to the slot in which current is flowing and to produce a substantially linear variation of inductance between the maximum and minimum values.

7. The machine of claim 6 wherein the rotor segment flux guides comprise a stack of axially laminated iron sheets sandwiched with nonmagnetic material.

8. The machine of claim 6 wherein the stator winding has two phases.

9. The machine of claim 8 wherein the coils of each phase occupy adjacent slots in the stator.

10. A reluctance motor drive system, comprising:

(a) a stator including a core, and windings supported thereon formed of multiple coils, the windings having full pitch, plural poles and plural phases;

(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles;

(c) converter means for applying unidirectional current pulses to each phase of the stator at times of increasing inductance to achieve motoring operation.

11. A reluctance motor drive system, comprising:

(a) a stator including a core, and windings supported thereon formed of multiple coils, the windings having full pitch, plural poles and plural phases, wherein the stator core includes a plurality of slots formed therein, and the stator winding has a plurality of phase coils, each phase coil composed of a full pitch winding disposed in two stator slots;

(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles;

(c) converter means for applying unidirectional current pulses to each phase of the stator at times of increasing inductance to achieve motoring operation.

12. The system of claim 11 wherein the coil winding constituting each pole of a phase is wound in two slots of the stator core which are separated by a number of slots equal to the number of other phases, with the coils of the other phase or phases occupying the slots separating the two slots occupied by the coil.

13. A reluctance motor drive system, comprising:

(a) a stator including a core, and windings supported thereon formed of multiple coils, the windings having full pitch, plural poles and plural phases;

(b) a rotor having multiple pole segments which each include means for guiding the flux of the stator windings to provide maximum inductance for a stator coil of each pole and phase which is conducting current when the rotor segment is aligned with that coil and minimum inductance when the rotor segment is out of alignment with that coil and aligned with the adjacent coil of the stator, with the number of rotor segments distributed about the periphery of the rotor equal to the number of stator poles, wherein the means for guiding the flux causes the inductance of each stator coil to change substantially linearly from minimum inductance to maximum inductance;

(c) converter means for applying unidirectional current pulses to each phase of the stator at times of increasing inductance to achieve motoring operation.

14. The system of claim 11 wherein the means for guiding the flux causes the inductance of each stator coil to change substantially linearly from minimum inductance to maximum inductance.

15. The system of claim 10 wherein the converter means includes two transistors connected to a source of DC power, the stator having two phase windings and each transistor connected to one of the two phases to control the application of current pulses to the phase winding.

* * * * *